United States Patent [19]
Kobayashi et al.

[11] Patent Number: 5,555,232
[45] Date of Patent: Sep. 10, 1996

[54] OPTICAL HEAD WITH BUILT-IN SEMICONDUCTOR LASER, OBJECTIVE LENS AND ¼ WAVELENGTH PLATE

[75] Inventors: Shohei Kobayashi; Takeshi Yamazaki, both of Hachioji; Tsuneo Yanagida, Hino; Haruhiko Takemura; Toshihiro Ogata, both of Hachioji, all of Japan

[73] Assignee: Olympus Optical Co., Ltd., Tokyo, Japan

[21] Appl. No.: 336,782

[22] Filed: Nov. 9, 1994

[30] Foreign Application Priority Data

Nov. 19, 1993 [JP] Japan ................................. 5-290900
Apr. 12, 1994 [JP] Japan ................................. 6-073107

[51] Int. Cl.⁶ ........................... G11B 7/00; G11B 7/12
[52] U.S. Cl. .................. 369/112; 369/44.12; 369/44.23; 369/122
[58] Field of Search ........................... 369/286, 112, 369/110, 120, 44.11, 44.12, 44.14, 44.32, 122, 44.23

[56] References Cited

U.S. PATENT DOCUMENTS

| | | | |
|---|---|---|---|
| 5,285,062 | 2/1994 | Lee | 369/44.14 |
| 5,337,302 | 8/1994 | Gotoh et al. | 369/122 |
| 5,396,061 | 3/1995 | Taniguchi et al. | 369/112 |
| 5,404,009 | 4/1995 | Kando et al. | 369/112 |
| 5,438,586 | 8/1995 | Ishii et al. | 369/122 |
| 5,446,719 | 8/1995 | Yoshida et al. | 369/122 |

FOREIGN PATENT DOCUMENTS 4-206046  7/1992  Japan.

*Primary Examiner*—Georgia Y. Epps
*Assistant Examiner*—Kim-Kwok Chu
*Attorney, Agent, or Firm*—Frishauf, Holtz, Goodman, Langer & Chick

[57] ABSTRACT

An optical head has a semiconductor laser for emitting light, a collimator lens for converting the light from the laser into a parallel light beam, a semiconductor substrate for reflecting the light beam, and an objective lens for focussing the light beam reflected from the substrate on the optical disk. A ¼ wavelength plate is situated between the substrate and the objective lens. A beam splitter which transmits the light from the laser and reflects the light returning from the disk is provided between the collimator lens and the substrate. Following the beam splitter, a collective lens, a cylindrical lens and an optical detector are arranged in this order on an optical path for the returning light. A light receiving element for outputting a signal corresponding to the intensity of the light received is formed on the semiconductor substrate, and a polarizing film is formed on the surface thereof.

15 Claims, 6 Drawing Sheets

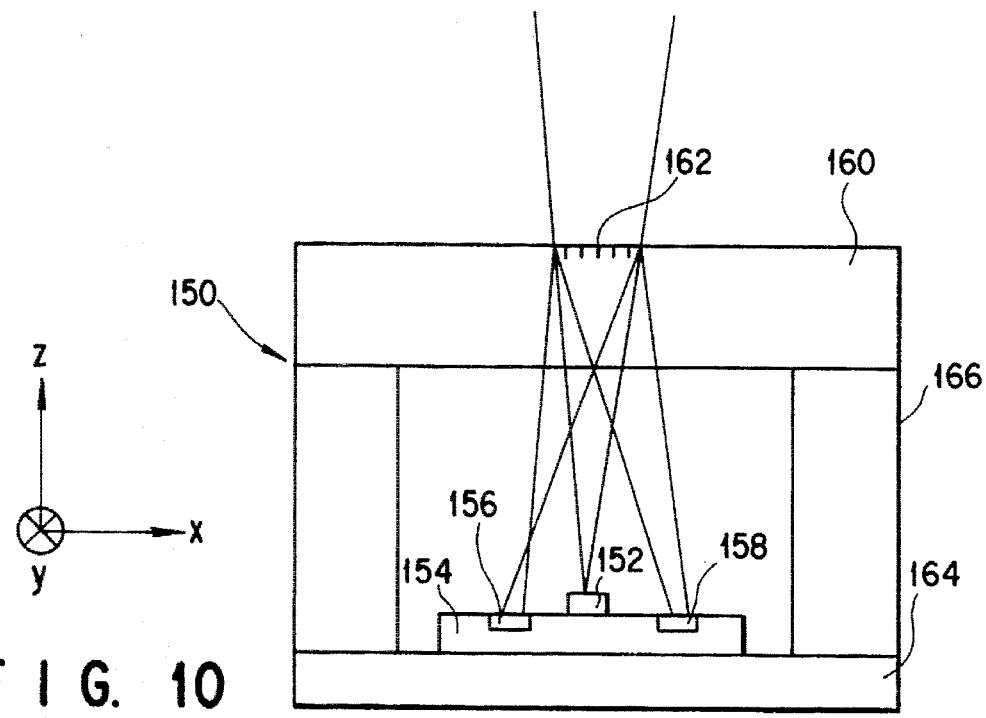
F I G. 10
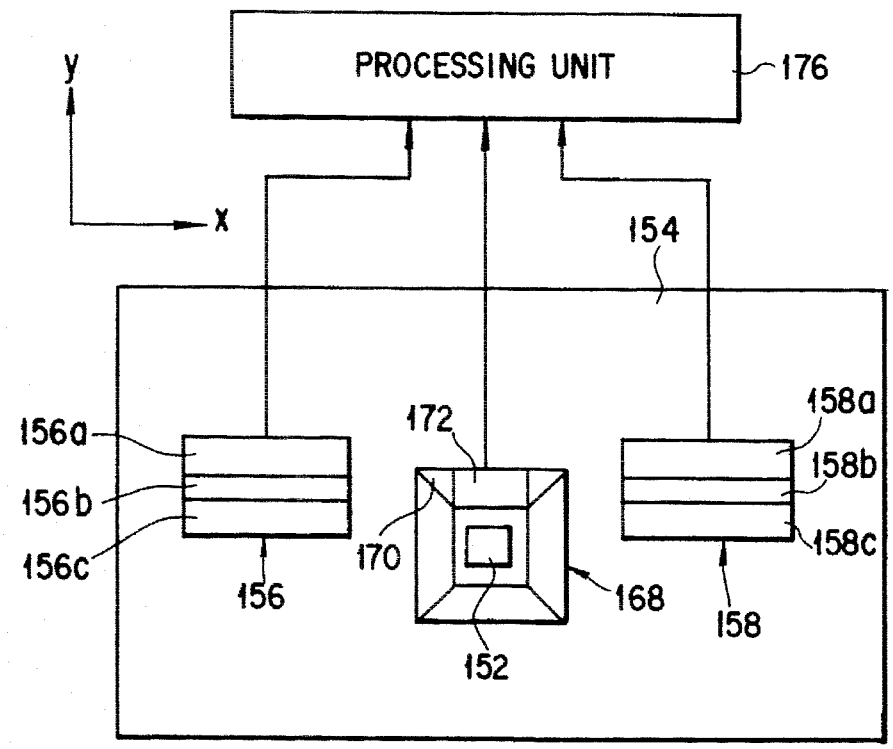
F I G. 11

TRACKING DIRECTION ←→
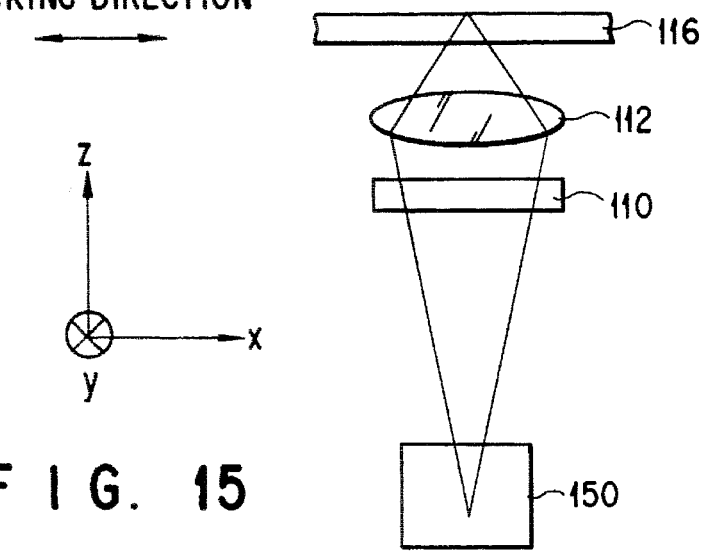
F I G. 15

OPTICAL HEAD WITH BUILT-IN SEMICONDUCTOR LASER, OBJECTIVE LENS AND ¼ WAVELENGTH PLATE

BACKGROUND OF THE INVENTION

1. Field of the Invention

The present invention relates to an optical head for optically recording and/or reproducing data.

2. Description of the Related Art

An optical head for recording and/or reproducing data is described in Jap. Pat. Appln. KOKAI Publication No. 4-206046. FIG. 16 shows the structure of such an optical head. As shown in this figure, a semiconductor laser 11 and a light receiving element 14 are provided in an enclosure case 16, and the light receiving element 14 is arranged such as to be tilted by 45 degrees with respect to the semiconductor laser 11. A window 17, through which a light beam reflected on the light receiving element 14 passes, is formed in the enclosure case 16, and an objective lens 13 for focussing the light beam on an optical disk (not shown) is mounted on the window 17.

Light emitted from the semiconductor laser 11 is reflected by the light receiving element 14, and irradiated on the recording surface (not shown) of the optical disk by the objective lens 13. The reflection light modulated by the recording surface of the optical disk is collected by the objective lens 13 and made incident on the light receiving element 14.

As shown in FIG. 17, the light receiving element 14 has two detectors A and B. The detector A receives the reflection light beam from the optical disk, and a reproduced signal, a focussing error signal and a tracking error signal are obtained based on this reflection light beam. The detector B receives the light beam output from the semiconductor laser 11, and the output is used to control the light emission amount of the semiconductor laser 11.

With this optical head, one semiconductor substrate, on which the light receiving element is formed, functions as both a mirror for reflecting the light beam from the semiconductor laser and a detector for detecting the light beam reflected from the optical disk. Therefore the size of the optical head is reduced.

However, since the light emitted from the semiconductor laser and the reflected light from the optical disk interfere with each other on the surface of the detector A, a reproduced signal, a focussing error signal and a tracking error signal cannot be accurately obtained. Further, since reflected light from the objective lens or a member for supporting the objective lens interferes with light output from the semiconductor laser on the surface of the detector A, those signals cannot be accurately obtained.

SUMMARY OF THE INVENTION

The main purpose of the present invention is to provide an optical head capable of accurately detecting a light beam from the semiconductor laser and/or a reflected beam from an optical disk, by completely separating one light beam from the other without these beams interfering with each other.

Another purpose of the invention is to provide an optical head capable of accurately detecting a light beam from a semiconductor laser by completely separating the light beam from a reflected light beam from an objective lens or a member for supporting the objective lens.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 illustrates the structure of the complex optical unit shown in FIG. 9;

FIG. 11 is a diagram illustrating the semiconductor substrate shown in FIG. 10, viewed from top;

FIG. 15 shows the structure of an optical head according to the fifth embodiment of the present invention;

DETAILED DESCRIPTION OF THE PREFERRED EMBODIMENTS

Figure 2:
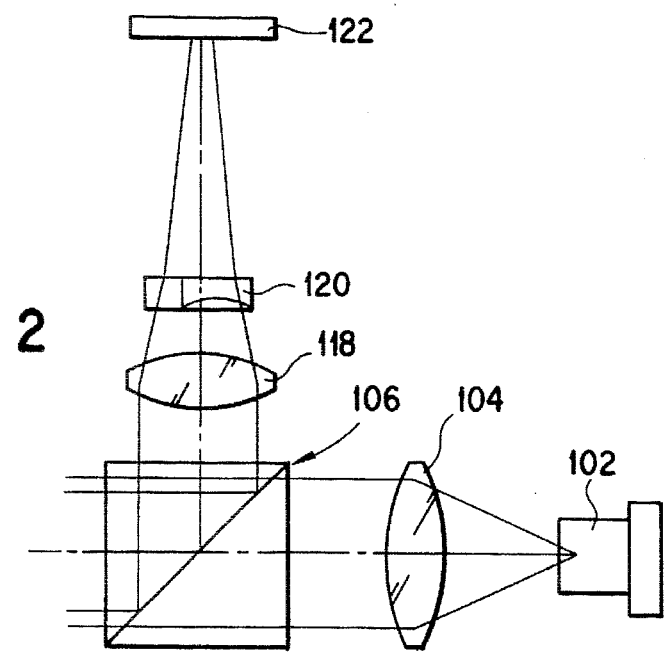
FIG. 2 is a diagram showing a part of the optical head shown in FIG. 1, when viewed from the direction A.
Figure 3:
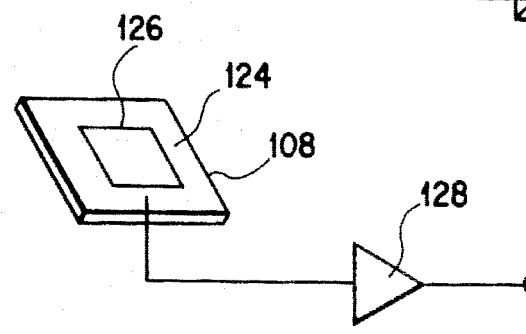
FIG. 3 shows a light receiving element formed on the semiconductor substrate shown in FIG. 1 and an amplifier connected to the element.

An optical head according to the first embodiment of the present invention will now be described with reference to FIGS. 1 to 3.

Figure 1:
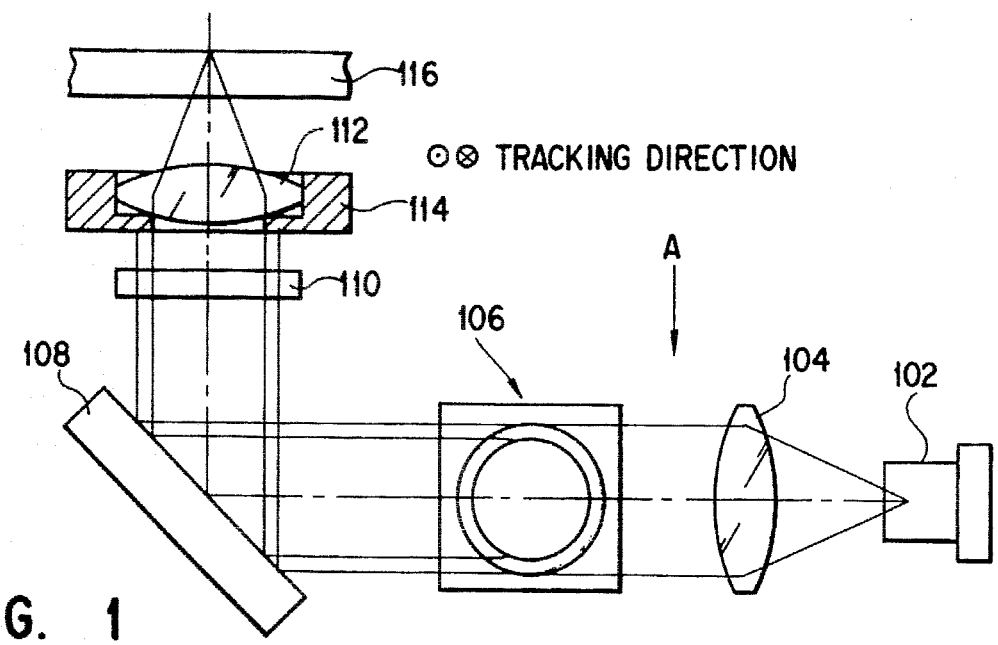
FIG. 1 shows the structure of an optical head according to the first embodiment of the present invention.

Referring now to FIG. 1, the optical head includes a semiconductor laser 102 for emitting light, a collimator lens 104 for converting the light from the semiconductor laser 102 into a parallel light beam, a semiconductor substrate 108 for reflecting and deflecting the parallel light beam by 90 degrees, and an objective lens 112 for focussing the parallel light beam from the semiconductor substrate 108 on an optical disk 116. A ¼ wavelength plate 110 is situated between the semiconductor substrate 108 and the objective lens 112. Situated between the collimator lens 104 and the semiconductor substrate 108, is a beam splitter 106 which transmits the light from the semiconductor laser 102 and reflects the reflected light from the optical disk 116. As shown in FIG. 2, a collective lens 118, a cylindrical lens 120 and an optical detector 122 are arranged in this order in the rear of the beam splitter 106 on the optical path of the reflecting light. As shown in FIG. 3, a light receiving element 126 for outputting a signal corresponding to the intensity of light received, is formed on the semiconductor substrate 108, and an amplifier 128 is connected to the light receiving element 126. A polarizing film 124 having the structure of multi-coatings in which, for example, $SiO_2$ and $Si_3N_4$ are alternately laminated, is formed on the surface of the semiconductor substrate 108. The optical head is supported movable in the tracking direction, which is vertical to the drawing page.

The light emitted from the semiconductor laser 102 is converted by the collimator lens 104 into a parallel light beam, which passes through the beam splitter 106, and then the parallel light beam with P polarization is made incident on the semiconductor substrate 108. The light beam with P polarization made incident on the semiconductor substrate 108 is mostly reflected by the effect of the polarization film 124, and the rest passes through and is made incident on the light receiving element 126, where the intensity thereof is detected. The light reflected by the semiconductor substrate 108 is converted into circularly polarized light by passing through the ¼ wavelength plate 110. The circularly polarized light is made incident on the objective lens 112 and applied onto the optical disk 116 as a spot. The diameter of the parallel light beam is limited by an objective lens holder 114 when made incident on the objective lens 112. The light reflected by the optical disk 116 returns in the form of circularly polarized light having a rotating direction opposite to that before the reflection, and the circularly polarized light is collected by the objective lens 112. Then, the light passes again through the ¼ wavelength plate, and made incident on the semiconductor substrate 108. The returning light made incident on the semiconductor substrate 108, which is now S-polarized light in the result of passing through the ¼ wavelength plate 110 two times, is totally reflected by the polarizing film 124, then made incident on the beam splitter 106 and totally reflected thereby. Then, the light beam reflected from the beam splitter 106 passes through the collective lens 118 and the cylindrical lens 120, it is converted into a converging beam having an astigmatism, and directs to the optical detector 122.

The optical detector 122 includes a light receiving element having four divided light receiving portions. A focussing error signal is obtained by the astigmatism method, and a tracking error signal is obtained by the push-pull method. A reproduced signal of data is obtained in the form of sum of outputs from the four light receiving portions.

The light having passed through the polarizing film 124 is detected by the light receiving element 126, and its output is amplified by the amplifier 128, and used as a monitor signal for controlling the light emission amount of the semiconductor laser 102.

According to this embodiment, the light emitted from the semiconductor laser 102 and the returning light reflected from the optical disk 116 are separated from each other, and only the light emitted from the semiconductor laser 102 is detected by the light receiving element 126, thus making it possible to obtain an accurate monitor signal.

An optical head according to the second embodiment will now be described with reference to FIGS. 4 and 5. In these figures, structural members similar to those of the first embodiment will be designated by the same reference numerals.

Figure 4:
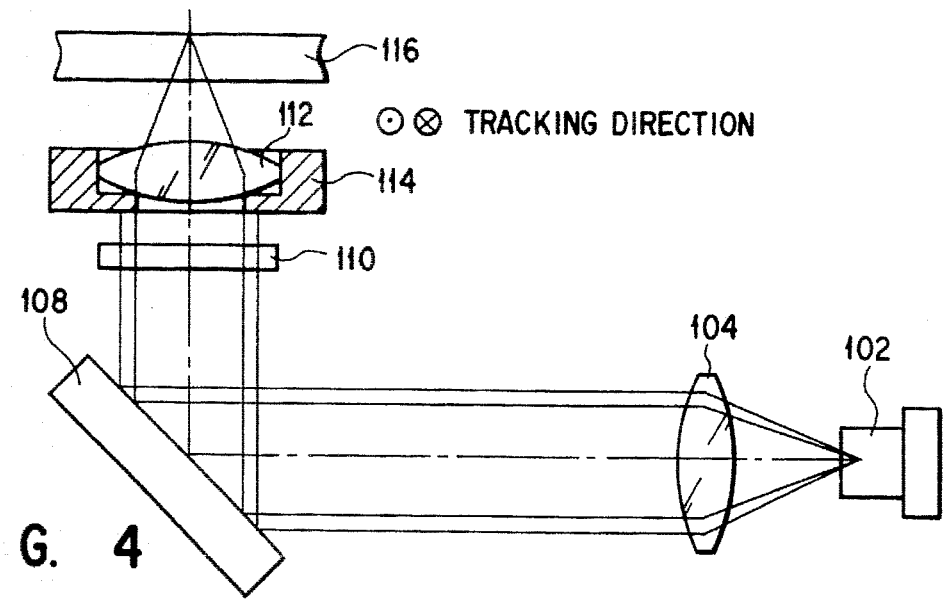
FIG. 4 shows the structure of an optical head according to the second embodiment of the present invention.
Figure 5:
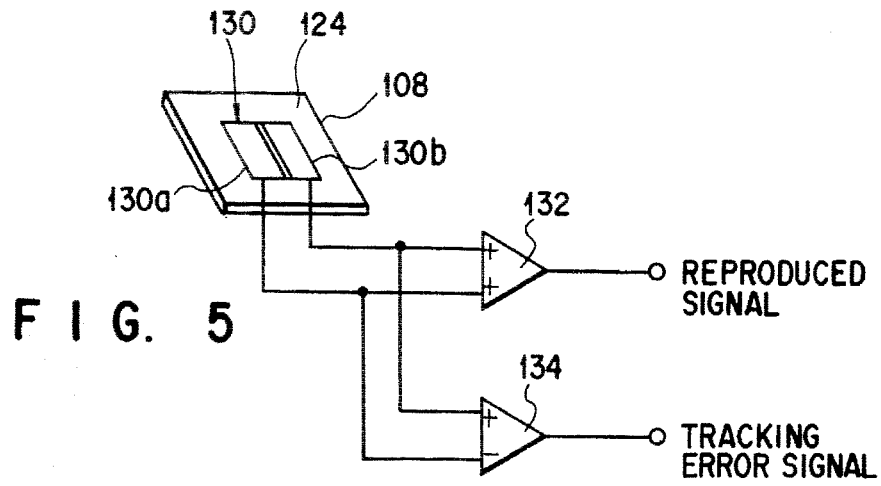
FIG. 5 shows a light receiving element formed on the semiconductor substrate shown in FIG. 4 and peripheral circuits connected to the element.

Referring now to FIG. 4, the optical head of this embodiment, unlike that of the first embodiment, does not include the beam splitter 106, the collective lens 118, the cylindrical lens 120 or the optical detector 122. Further, as can be seen in FIG. 5, a light receiving element 130 having two light receiving portions 130a and 130b is formed on the semiconductor substrate 108. To the light receiving portions 130a and 130b, an adder 132 for calculating the sum of outputs from both portions and a subtracter 134 for calculating the difference between outputs from both portions are connected. The semiconductor laser 102 and the polarizing film 124 are arranged in such a positional relationship that the light which is S-polarized with respect to the polarizing film 124 is made incident from the semiconductor laser 102 on the polarizing film 124.

The light from the semiconductor laser 102, which is S-polarized with respect to the semiconductor substrate 108, is made incident thereon, and then totally reflected by the polarizing film 124. The returning light reflected from the optical disk 116 is now P-polarized with respect to the semiconductor substrate 108 and made incident thereon. Part of the incident light is reflected by the polarizing film 124 and returns to the semiconductor laser 102, and the rest passes through the polarizing film 124 and is received by the light receiving element 130.

A data reproduced signal is obtained as a sum signal of outputs of the light receiving portions 130a and 130b of the light receiving element 130, which is output from the adder 132. A tracking error signal is obtained by the push-pull method, as a difference signal between outputs of the light receiving portions 130a and 130b of the light receiving element 130, which is output from the subtracter 134. A focussing error signal is obtained in the form of operation current of the semiconductor laser 102. More specifically, in the case where the objective lens 112 is in the focal state with respect to the optical disk 116, the returning light reflected from the optical disk 116 returns accurately onto the semiconductor laser 102, thus minimizing the operation current. Therefore, the objective lens 112 is moved along the optical axial direction and the position thereof is adjusted such that the operation current is minimized at all times.

According to the present embodiment, the light emitted from the semiconductor laser 102 and the returning light reflected from the optical disk 116 are separated from each other, and only the returning light reflected from the optical disk 116 is made incident on the light receiving element 130, where the intensity of the light is detected, thus obtaining an accurate data reproduced signal and an accurate tracking error signal.

An optical head according to the third embodiment, which is a remodeled version of the second embodiment, will now be described with reference to FIGS. 6 to 8. In these figures, those members which have been already explained in the preceding embodiments will be designated by the same reference numerals.

Figure 6:
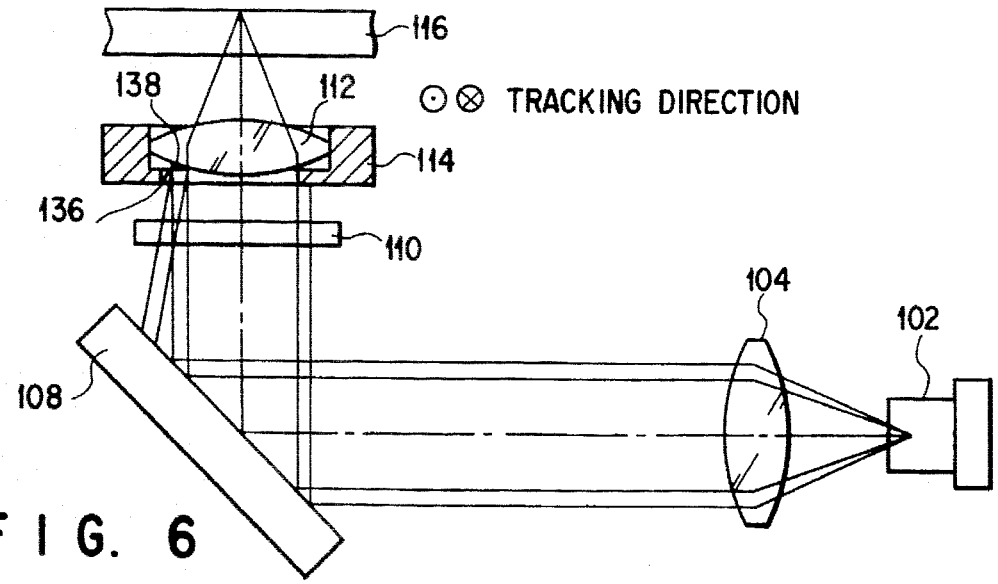
FIG. 6 shows the structure of an optical head according to the third embodiment of the present invention.
Figure 7:
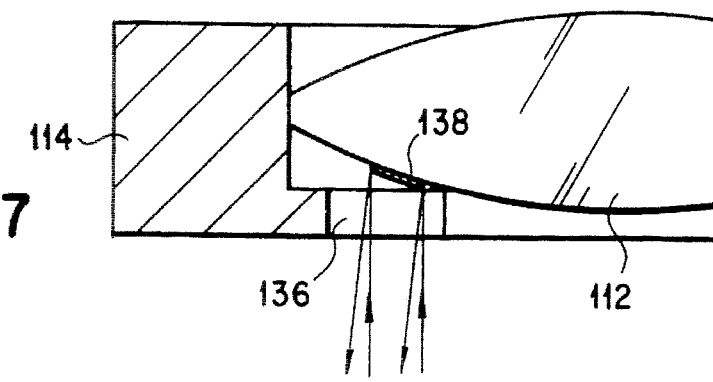
FIG. 7 is a diagram showing an enlarged partial view of the objective lens and the periphery thereof, shown in FIG. 6.
Figure 8:
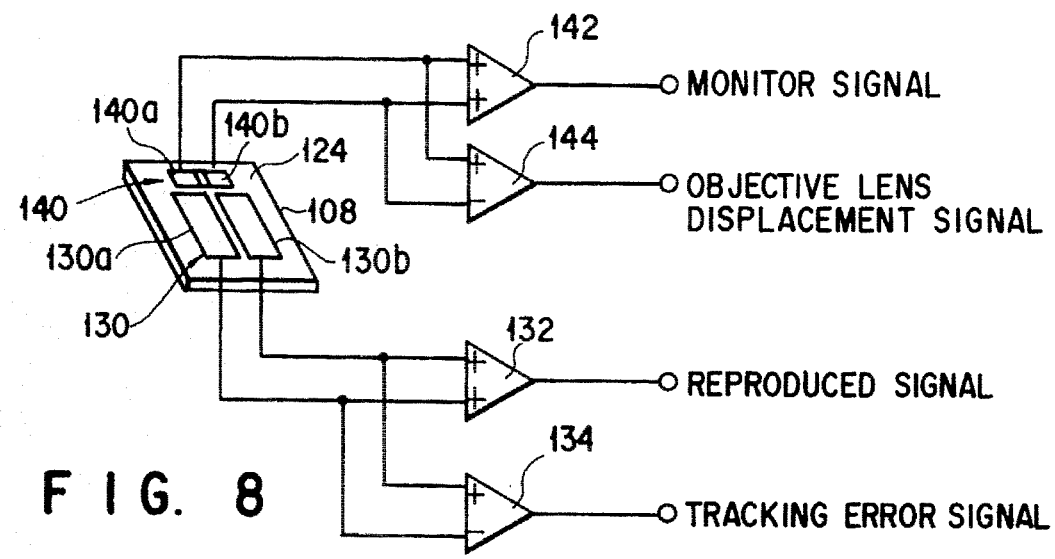
FIG. 8 shows a light receiving element formed on the semiconductor substrate shown in FIG. 6 and peripheral circuits connected to the element.

Referring now to FIGS. 6 and 7, a notch 136 is made at a certain section of the objective lens holder 114, and part of the light which is blocked in the second embodiment, can reach the objective lens 112. A reflecting member for reflecting the light having passed through the notch 136 towards the semiconductor substrate 108, is formed at a corresponding section on the lower surface of the objective lens 112. In addition to the light receiving element 130, another light receiving element 140 is formed on the semiconductor substrate 108. The light receiving element 140 contains two light receiving portions 140a and 140b, to which an adder 142 for calculating the sum of outputs from both portions and a subtracter 144 for calculating the difference between outputs therefrom, are connected. The reflecting member 138 is provided at such an angle that light reflected by the reflecting member 138 and light emitted from the semiconductor laser 102 are not mixed with each other on the semiconductor substrate 108. With the reflecting member 138, the light reflected on the member is completely separated from the light emitted from the semiconductor laser 102.

A data reproduced signal, a tracking error signal and a focussing error signal are obtained in the same manners as those of the second embodiment.

Of the light which is emitted from the semiconductor laser 102 and made incident on the objective lens 112, the portion of the light which have passed the notch 136 of the objective lens holder 114 is reflected by the reflecting member 138. The reflected light passes through the ¼ wavelength plate 110, by which it is P-polarized. Then the light beam is made incident on the semiconductor substrate 108, and after passing through the polarizing film 124, the light is made incident on the light receiving element 140.

A monitor signal is obtained as the sum signal of outputs of the light receiving portions 140a and 140b of the light receiving member 140, which is output from the adder 142. A signal indicating the amount of movement of the objective lens in the tracking direction is obtained as a difference between outputs of the light receiving portions 140a and 140b of the light receiving member 140, which is output from the subtracter 144.

In the third embodiment, it is not essential that the reflecting member 138 is provided on the objective lens 112, but the reflecting member 138 may be provided for a section of the objective lens holder 114.

It should be also noted that the polarizing film 124 is not essential in the second and third embodiments for the following reason. That is, due to the effect of the ¼ wavelength plate 110, the light emitted from the semiconductor laser 102 is S-polarized with respect to the semiconductor substrate 108 and made incident thereon, whereas the returning light reflected from the optical disk 116 is P-polarized with respect to the semiconductor substrate 108 and made incident thereon. As generally well-known, S-polarized light and P-polarized light do not interfere with each other, and therefore the light emitted from the semiconductor laser 102 only influence as a constant direct current component to the signals at all times. In this case, the utilization efficiency of light decreases; however, it has the merit that it is not necessary to coat the semiconductor substrate 108 with a polarization film 124.

Note that the light utilization efficiency should not be significantly reduced, but at the same time, the number of layers in the polarization film 124 should not be increased. To balance with each other, the reflectance for the S-polarized light may be reduced to about 80% by decreasing the number of layers in the polarization film 124, accordingly. For the same reason as in the case where there is no polarization film 124, this case does not entail any problem. To summarize, in this specification, a polarizing film is not meant to be a film which completely reflect S-polarized light, but, in a wider sense, which simply separates light beams from each other.

In the preceding three embodiments, the tracking direction is set in a direction vertical to the surface of a page; however the present invention is not limited to such embodiments, but the direction may be in parallel with the page. In this case, with regard to the third embodiment, the position of the reflecting member 138 and the arrangement of the light receiving elements 130 and 140 must be rotated by 90° around the optical axis.

An optical head according to the fourth embodiment of the present invention will now be described with reference to FIGS. 9 to 14.

Figure 9:
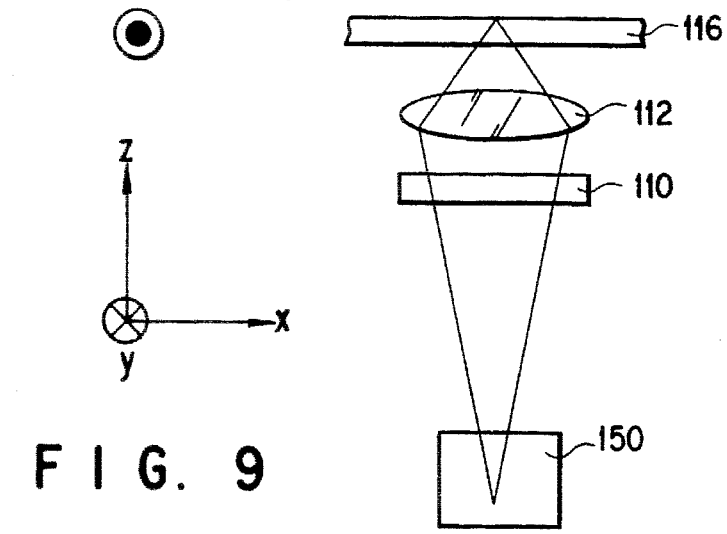
FIG. 9 shows the structure of the optical head according to the fourth embodiment of the present invention.

Referring now to FIG. 9, the optical head basically includes a composite optical unit 150 for emitting light and receiving returning light, an objective lens 112 for focussing the light emitted from the composite optical unit 150 on the optical disk 116, and a ¼ wavelength plate 110 provided between the composite optical unit 150 and the objective lens 112.

The composite optical unit 150, as shown in FIG. 10, includes a semiconductor laser for emitting a laser beam, a hologram element 160 for separating the returning light into a 0-order diffraction light beam and ±1st-order diffraction light beams, and two light-receiving elements 156 and 158 for receiving the ±1st-order diffraction light beams separated by the hologram element 160. The light receiving elements 156 and 158 are formed on the semiconductor substrate 154 by a semiconductor process, and the semiconductor laser 152 is fixed onto the semiconductor substrate 154. The semiconductor substrate 154 is fixed onto a substrate 164, and the hologram element 160 is supported above the semiconductor substrate 154 by spacers 166 built up on the substrate 164.

Figure 12:
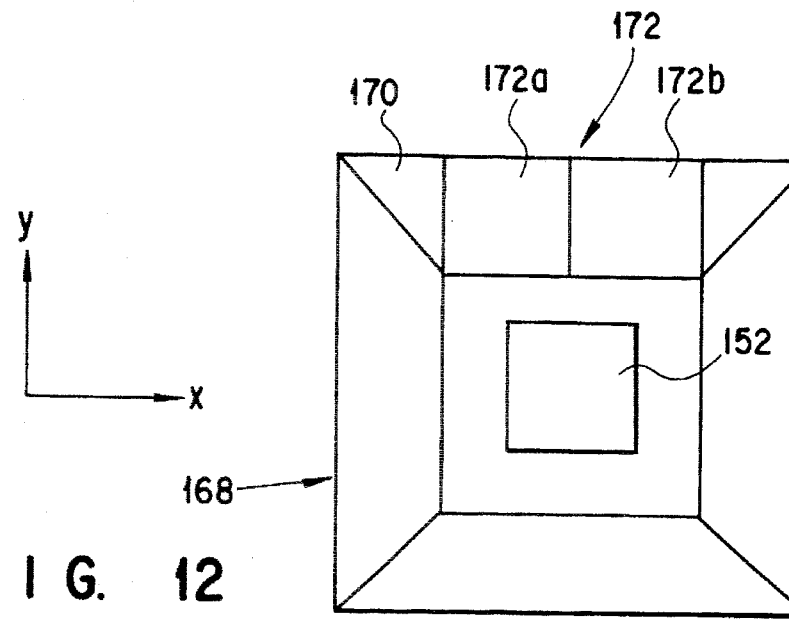
FIG. 12 is an enlarged view of the periphery portion of the laser of the semiconductor substrate shown in FIG. 11.
Figure 13:
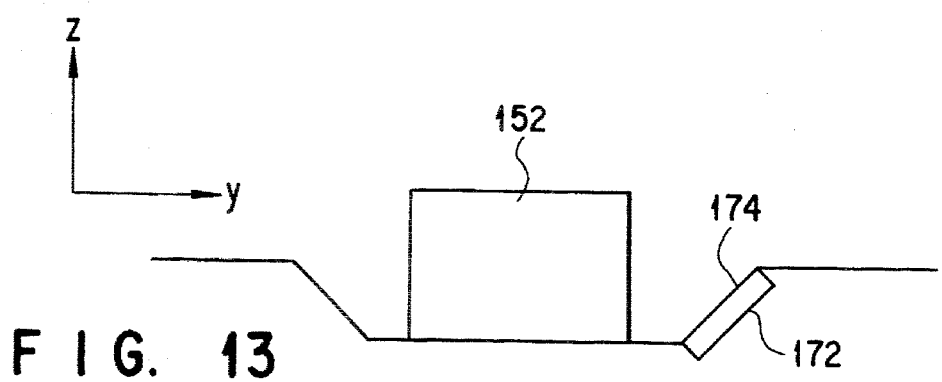
FIG. 13 shows the sectional structure of the periphery portion of the laser of the semiconductor substrate shown in FIG. 11.

As shown in FIG. 11, the two light receiving elements 156 and 158 have three light receiving portions 156a–156c and 158a–158c, respectively. A recess 168 surrounded by four slanting surfaces is formed in the center portion of the semiconductor substrate 154, and the semiconductor laser 152 is fixed at the bottom surface of the recess. Of the four slanting surfaces surrounding the semiconductor laser 152, a slanting surface 170 which faces the emitting surface of the semiconductor laser 152 has a light receiving element 172. The light receiving element 172, as can be seen in FIG. 12, has two light receiving portions 172a and 172b. On the surface of the slanting surface, that is, on the light receiving element 172, a dielectric multilayered film 174 which reflects S-polarized light at substantially 100% and transmits P-polarized light at substantially 100%, is formed. As shown in FIG. 11, the three light receiving elements 156, 158 and 172 are connected to a calculation processing unit 176, where outputs from these elements are calculated.

Figure 14:
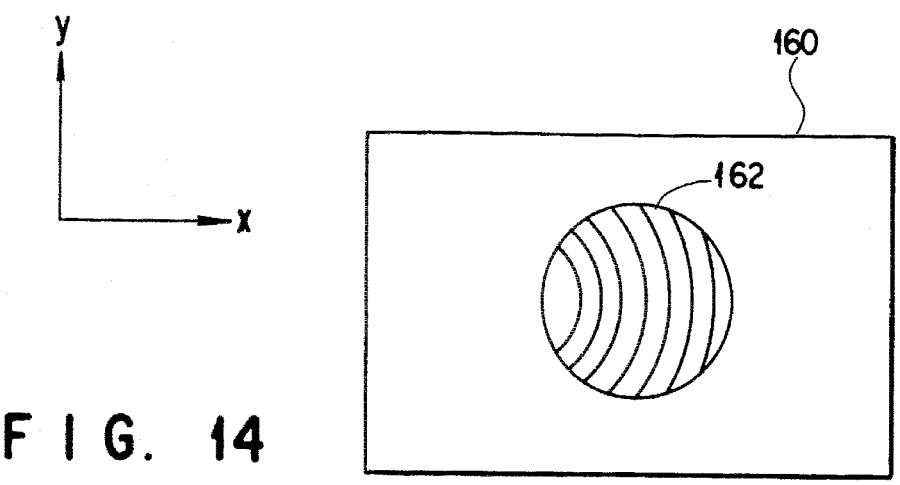
FIG. 14 is a diagram illustrating the pattern of a hologram formed in the hologram element shown in FIG. 10.
Figure 16:
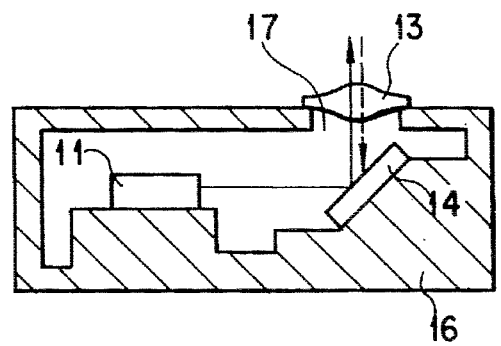
FIG. 16 shows the structure of a conventional optical head.
Figure 17:
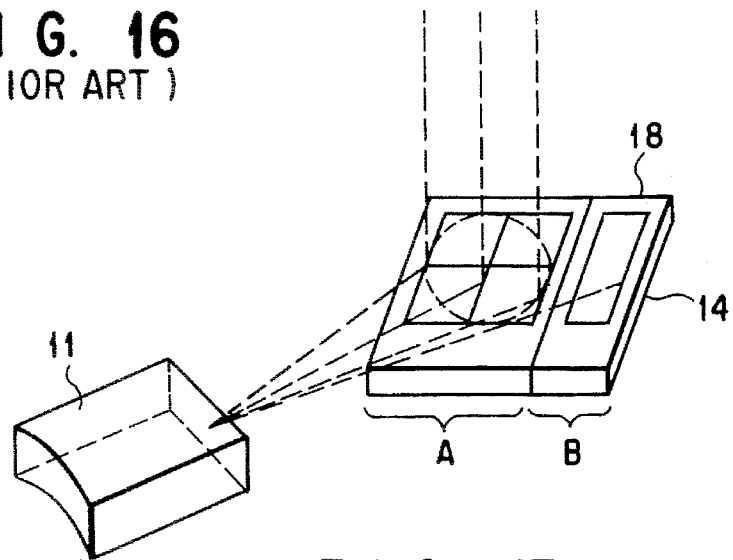
FIG. 17 is a perspective view of the semiconductor laser and the light receiving element, shown in FIG. 16.

The hologram element 160 has a hologram 162 having a pattern as shown in, for example, FIG. 14. As illustrated in FIG. 10, the hologram 162 has the functions of transmitting the light from the semiconductor laser 152, and separating returning light into a 1st-order diffraction light beam which is convergence and has a focal point in a rear side of the light receiving element 158, and a −1st-order diffraction light beam which is convergence and has a focal point in a front side of the light receiving element 156.

The semiconductor laser 152 emits the light having a linearly polarized beam which is S-polarized with respect to the slanting surface 170. The laser beam emitted from the semiconductor laser 152 is totally reflected substantially upwards, and the reflection light passes through the hologram 162. As the light further passes through the ¼ wavelength plate 110, the light is circularly polarized, and focused onto the optical disk 116 by the objective lens 112. The light reflected by the optical disk 116 is collected by the objective lens 112, and as the light passes again through the ¼ wavelength plate 110, the light is linearly polarized with its polarizing direction rotated by 90° with respect to the original linearly polarized light, that is, P-polarized with respect to the slanting surface 170. Then, the P-polarized light is made incident on the hologram 162, and separated into a 0-order diffraction light beam, and ±1st-order diffraction light beams. The 0-order diffraction light beam is P-polarized with respect to the slanting surface 170, and made incident thereon. Therefore, almost 100% of the incident light passes through the dielectric multi-layered film 174 made on the slanting surface 170, and is further input to the light receiving element 172. The −1st diffraction light beam is directed towards the light receiving element 156 on the left-hand side in FIG. 10, whereas the +1st diffraction light beam is directed towards the light receiving element 158 on the right-hand side. The −1st diffraction light beam has a focal point in a front side of the light receiving element 156, whereas the +1st diffraction light beam has a focal point in a rear side of the light receiving element 158. When the beams are in focus on the optical disk 116, the ±1st-order diffraction light beams form spots having the same size, on the surfaces of the light receiving elements 156 and 158.

Various signals can be obtained by carrying out the following operations by the calculation processing unit 176. A data reproduced signal of the optical disk 116 is obtained as the sum of outputs from two light receiving portions 172a and 172b of the light receiving element 172, or the sum of outputs from two light receiving elements 156 and 158, i.e. the total of outputs from light receiving portions 156a–156c and 158a–158c, or the total of outputs from two light receiving elements 156 and 158 (light receiving portions 156a–156c and 158a–158c) and an output from light receiving element 172 (light receiving portions 172a and 172b). A tracking error signal is obtained by the push-pull method as the difference between outputs from two light receiving portions 172a and 172b of the light receiving element 172. A focussing error signal can be obtained by the beam size method. More specifically, the +1st-order diffraction light beam and the −1st-order diffraction light beam are different from each other in the focal power of the hologram 162, and therefore when the beams becomes out of focus on the optical disk 116, the sizes of the spots formed on the light receiving elements 156 and 158 reversely vary. Therefore, the focussing error signal FE can be obtained by the calculation formula, $$FE = (S_{156a} + S_{156c} + S_{158b}) - (S_{156b} + S_{158a} + S_{158c})$$

where $S_{156a}$, $S_{156b}$, $S_{156c}$, $S_{158a}$, $S_{158b}$ and $S_{158c}$ represent outputs from light receiving portions 156a, 156b, 156c, 158a, 158b and 158c, respectively.

In this embodiment, the light from the semiconductor laser 102 and the returning light reflected from the optical disk 116 are separated, and only the reflected light from the optical disk 116 is detected by the light receiving element 172, and the light receiving elements 156 and 158. Therefore, an accurate data reproduced signal and an accurate tracking error signal can be obtained as in the preceding embodiments. Further, in this embodiment, the semiconductor laser 152 is provided on the semiconductor substrate 154 on which the light receiving elements 156, 158 and 172 are formed, thus making it possible to reduce the size of the product.

An optical head according to the fifth embodiment of the present invention will now be described with reference to FIG. 15. This embodiment is a remodeled version of the fourth embodiment, with a tracking direction being rotated by 90°, and otherwise the structure of this embodiment is similar to that of the fourth embodiment, including the direction of the composite optical unit 150.

In this embodiment, a focussing error signal and a data reproduced signal are obtained in the same manner as in the fourth embodiment. With regard to a tracking error, the incident beam on the composite optical unit 150 moves in the direction vertical to the page of FIG. 15, and therefore the tracking error signal TE is obtained by push-pull method from the calculation formula, $$TE = (S_{156a} + S_{158c}) - (S_{156c} + S_{158a}).$$

In similar to the fourth embodiment, according to this embodiment, an accurate reproduced signal and an accurate tracking error signal can be obtained, and further the size of the optical head can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical head for optically recording and/or reproducing data on/from a recording mediums, comprising:

a semiconductor laser for emitting light;

a semiconductor substrate for reflecting the emitted light from said semiconductor laser to said recording medium;

a light receiving element formed on said semiconductor substrate;

an objective lens for focussing the light from said semiconductor substrate on said recording medium; and a ¼ wavelength plate situated between said semiconductor substrate and said objective lens.

2. An optical head according to claim 1, wherein said light receiving element includes a single light receiving portion which outputs a signal corresponding to an intensity of the light received.

3. An optical head according to claim 2, further comprising:

a beam splitter, provided between said semiconductor substrate and said semiconductor laser, for transmitting the light emitted from said semiconductor laser, and reflecting the light from said semiconductor substrate;

converting means for converting light reflected by said beam splitter into a converging light beam having an astigmatism; and a four-divisional light receiving element for receiving the converging light beam.

4. An optical head according to claim 3, wherein said converting means comprises a convex lens and a cylindrical lens.

5. An optical head according to claim 1, wherein said light receiving element comprises two light receiving portions, each outputting a signal corresponding to an intensity of light received by itself.

6. An optical head according to claim 5, further comprising:

means for calculating a sum of outputs from said two light receiving portions; and means for calculating a difference between outputs from said two light receiving portions.

7. An optical head according to claim 5, further comprising:

another light receiving element formed on said semiconductor substrate; and means for reflecting part of the light having passed through said ¼ wavelength plate and being directed to said objective lens, towards said another light receiving element.

8. An optical head according to claim 7, wherein said another light receiving element includes two light receiving portions, each outputting a signal corresponding to an intensity of light received by itself, further comprising:

means for calculating a sum of outputs from said two light receiving portions of said another light receiving element; and means for calculating a difference between outputs from said two light receiving portions of said another light receiving element.

9. An optical head according to claim 7, wherein said reflecting means includes a reflecting surface provided at a section of said objective lens.

10. An optical head for optically recording and/or reproducing data on/from a recording medium, comprising:

a semiconductor laser for emitting light;

a semiconductor substrate on which said semiconductor laser is mounted;

a light receiving element, formed on said semiconductor substrate, for deflecting the emitted light from said semiconductor laser by reflection to said recording medium;

an objective lens for focussing the light from said light receiving element on said recording medium; and a ¼ wavelength plate situated between said semiconductor substrate and said objective lens.

11. An optical head according to claim 10, further comprising a polarizing film formed on said light receiving element, said polarizing film reflecting the emitted light from said semiconductor laser to said recording medium, and passing through light reflected from said recording medium.

12. An optical head according to claim 11, wherein said semiconductor substrate has a recess having at least one slanting surface, said semiconductor laser is fixed to a bottom surface of said recess, and said light receiving element is formed on a slanting surface of said recess.

13. An optical head according to claim 12, further comprising:

a diffracting element, provided between said semiconductor substrate and said objective lens, for transmitting light from said light receiving element and diffracting light from said recording medium; and two light receiving elements, formed on said semiconductor substrate, for receiving ±1st-order diffraction light beams created by said diffracting element, respectively.

14. An optical head according to claim 13, wherein said diffracting element includes a hologram.

15. An optical head according to claim 13, wherein said diffracting element focuses said −1st-order diffraction light on a point in front of said light receiving element and said +1st-order diffraction light on a point in rear of said light receiving element, further comprising means for comparing sizes of beam spots formed on said two light receiving elements.

* * * * *